March 27, 1962  J. E. CAMPBELL ETAL  3,027,120
AUGMENTED CONTROL SYSTEM
Filed Feb. 14, 1958  8 Sheets-Sheet 1

INVENTORS
JAMES E. CAMPBELL
MAURICE E. WHEELOCK
MARSHALL H. ROE
BY
Charles F. Dischler
ATTORNEY

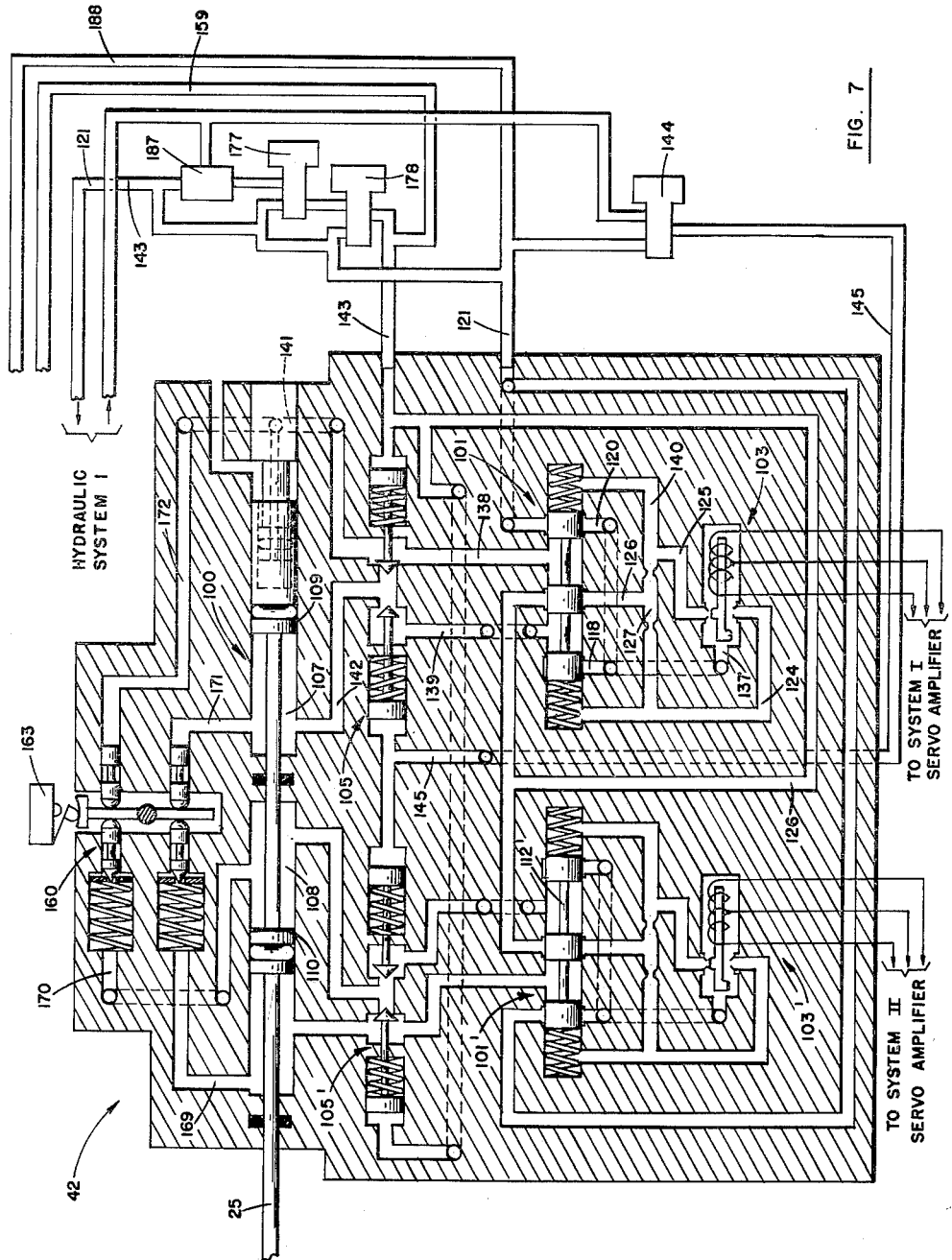

March 27, 1962 J. E. CAMPBELL ETAL 3,027,120
AUGMENTED CONTROL SYSTEM
Filed Feb. 14, 1958 8 Sheets-Sheet 7

*INVENTORS*
JAMES E. CAMPBELL
MAURICE E. WHEELOCK
BY MARSHALL H. ROE

*ATTORNEY*

March 27, 1962 J. E. CAMPBELL ETAL 3,027,120
AUGMENTED CONTROL SYSTEM
Filed Feb. 14, 1958 8 Sheets-Sheet 8

INVENTORS
JAMES E. CAMPBELL
MAURICE E. WHEELOCK
MARSHALL H. ROE
BY
Charles F. Dischler
ATTORNEY

United States Patent Office 3,027,120
Patented Mar. 27, 1962

3,027,120
AUGMENTED CONTROL SYSTEM
James E. Campbell, Palos Verdes Estates, Marshall H. Roe, Rolling Hills, and Maurice E. Wheelock, Culver City, Calif., assignors to North American Aviation, Inc.
Filed Feb. 14, 1953, Ser. No. 715,849
11 Claims. (Cl. 244—76)

This application relates to aircraft control systems and it particularly relates to control systems for supersonic aircraft wherein the flight mode and stability of the aircraft are improved by adding to the manually operated control system continuously and automatically applied corrective inputs which vary in accordance with the aerodynamic condition of the aircraft to maintain predetermined optimum flight control characteristics for the aircraft.

For aircraft operating in both the subsonic and the supersonic speed ranges, it has been found that satisfactory control of the aircraft solely through the pilot operated mechanical-hydraulic type of actuating mechanism is not available due to many factors such as excessive sensitivity or lack of sensitivity in the system, response time-lag, poor aerodynamic damping, the inability of the human pilot to react quickly enough and apply the controls in an optimum manner, and the like.

Considering only the longitudinal stability of the airplane, the characteristic modes of surface-fixed longitudinal motion for most airplanes are two oscillations, one of long period with poor damping (termed the phugoid mode) and the other of short period also with poor damping, especially at supersonic speeds and high altitudes. The phugoid mode is not ordinarily considered to be an important design factor, but, improvement of the damping of the short period mode by artificial means (other than basic aerodynamic design) is essential to insure optimum handling qualities of the airplane.

It is well known that stick forces in accelerated flight for an unaugmented airplane are a function of altitude, speed, weight, center of gravity position, and external store configuration. The variation in stick force per "$g$" of normal acceleration may be as great as 15 or 20 to 1 for extremes in flight conditions, external store configurations, etc. To insure desirable handling characteristics, it is important that the stick force per "$g$" be kept within optimum limits, and it is preferable that it be kept constant. If the gradient of stick force per "$g$" is too steep, the force required to operate the control surface is excessive, while if the gradient is too flat the aircraft will be too sensitive. It has also been found that stick displacement per "$g$" is important for good control. Even though forces are within desired limits, insufficient stick displacement per "$g$" can result in excessive sensitivity. Additionally, many present day unaugmented aircraft have the undersirable characteristic in the transonic speed range of zero or negative speed stability. The desired condition of positive speed stability is one in which an increase in speed requires a push force on the stick to maintain one "$g$" level flight and a decrease in speed requires a pull force. With negative speed stability, an increase in speed requires a pull force to maintain one "$g$" level flight.

The characteristics set forth above are a few of the factors which render the basic mechanical-hydraulic control system inadequate for securing stable easily controlled flight at relatively high supersonic speeds, as well as at subsonic conditions.

To overcome the above-stated objections, the operation of the basic pilot operated mechanical-hydraulic system for actuating the longitudinal control surface of an aircraft is augmented in the present device by a system connected in parallel with the mechanical-linkage system. That is, pilot inputs are transmitted to the control surface through both the mechanical system and the augmentation system. This augmentation system comprises a basic electromechanical longitudinal control means operable in response to control stick displacement and a further electromechanical means for sensing the aerodynamic condition of the aircraft and compensating for the same in a manner to provide the pilot with constant stick control functions related to the longitudinal handling characteristics throughout the full range of flight conditions as well as providing pitch damping, position trim, and positive speed stability.

The augmented longitudinal control system of this invention adds to or subtracts from the basic mechanical-hydraulic surface control system through a hydraulic-differential-servomechanism which is electronically controlled and which effectively adds its output mechanically in series with the control stick and stabilizer actuator. The differential servo moves the stabilizer to the correct position, by adding to or subtracting from the displacement due to the basic mechanical system, in response to a signal that is the difference between a signal corresponding to the pilot operated control stick input and signals corresponding to those aerodynamic parameters affecting the longitudinal stability of the aircraft at any instant. In the absence of any pilot-input signal the augmented control system continues to exert its stabilizing influence on the aircraft and compensates for transient accelerating forces acting on the aircraft in the longitudinal plane by providing constant speed stability characteristics as well as pitch damping and gust compensation.

Accordingly, it is an object of this invention to provide a control system which automatically provides a constant control stick force for each "$g$," acting on the aircraft; wherein one "$g$" is an acceleration equal to the acceleration of gravity.

It is also an object of this invention to provide a control system which automatically provides a constant control stick displacement for each "$g$" of acceleration applied to the aircraft.

It is also an object of this invention to provide automatically constant, positive speed stability of an aircraft.

It is also an object of this invention to provide a control having a constant control stick position for normal one "$g$" flight operation.

It is similarly an object of this invention to provide pitch damping of the airplane through proper motion of the control surface without corresponding motion of the control stick.

It is a further object of this invention to provide an automatic Mach hold control system for maintaining a desired Mach number.

It is also a further object of this invention to provide a control system incorporating the feature of automatic trim shift adjustment for flap operation which provides automatic pitch trim to maintain the preset trim attitude whenever the wing flaps are raised or lowered.

A still further object of this invention is to provide a control system having optimum landing and takeoff characteristics.

It is another object of this invention to provide an augmented longitudinal control system that is operable in conjunction with an automatic flight control system, i.e., a control system that can accept command signals from external guidance systems or act as a basic element in an automatic control loop.

It is also a further object of this invention to provide a control system having optimum breakout forces, i.e., forces required to initiate airplane response.

These and other objects and advantages of this invention will become apparent to those skilled in the art after reading the present specification and the accompanying drawings forming a part thereof, in which FIG. 1 is an idealized schematic view of the mechanical-hydraulic portion of the augmented control system of this invention but showing only one side of the dual linkage system interconnecting the forward and aft torque tubes;

FIG. 2 is a further schematic view of a part of the mechanical-hydraulic portion of the augmented control system showing the interconnection of the aft torque tube to the horizontal control surface with the stabilizer hydraulic actuator and the centering actuator in cross section and also showing the physical linkage system through which the input of the differential servo device is applied to the control surface;

FIG. 7 is a schematic representation of the differential servomechanism for transforming the electrical input of the augmented control system into a mechanical force;

Figure 1:
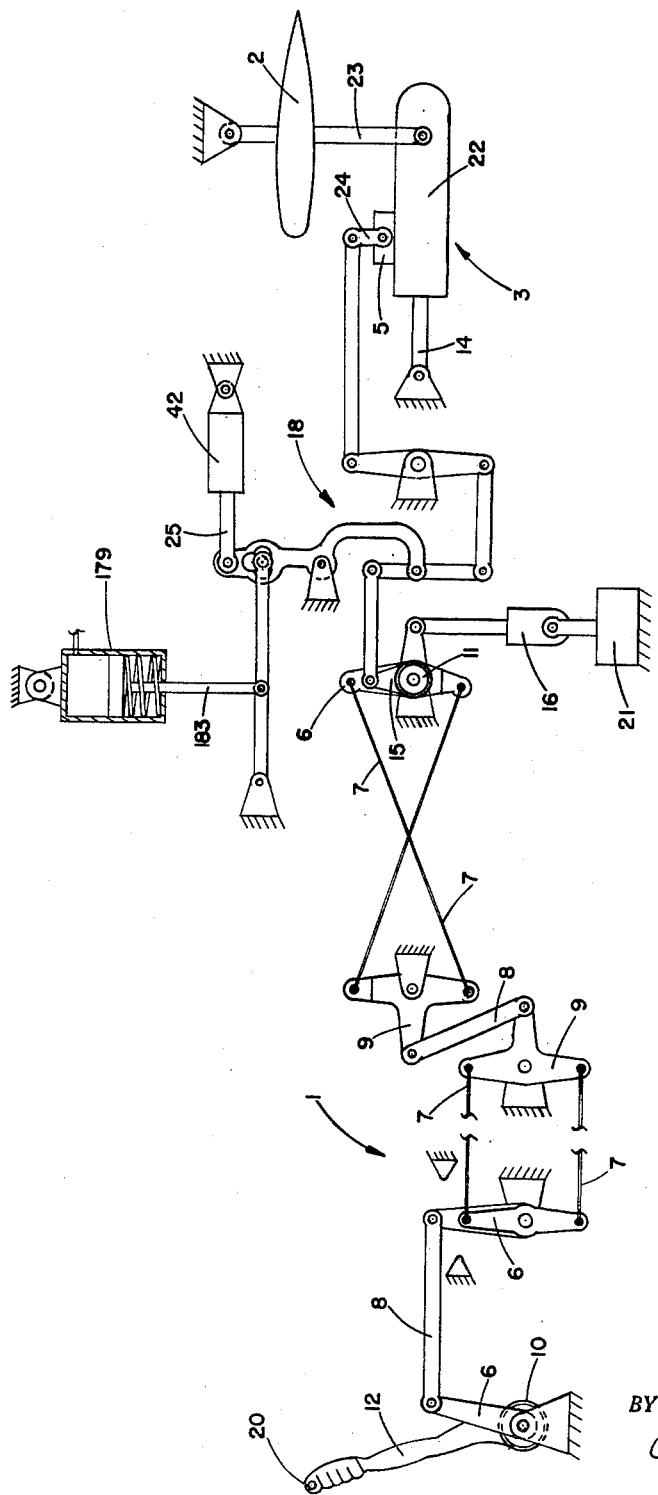

Referring specifically to the drawings wherein like reference characters have been used throughout the several views to designate like parts and referring at first to FIG. 1, reference numeral 1 generally designates an aircraft mechanical-hydraulic control system for operating a horizontal pitch control surface 2.

Figure 2:
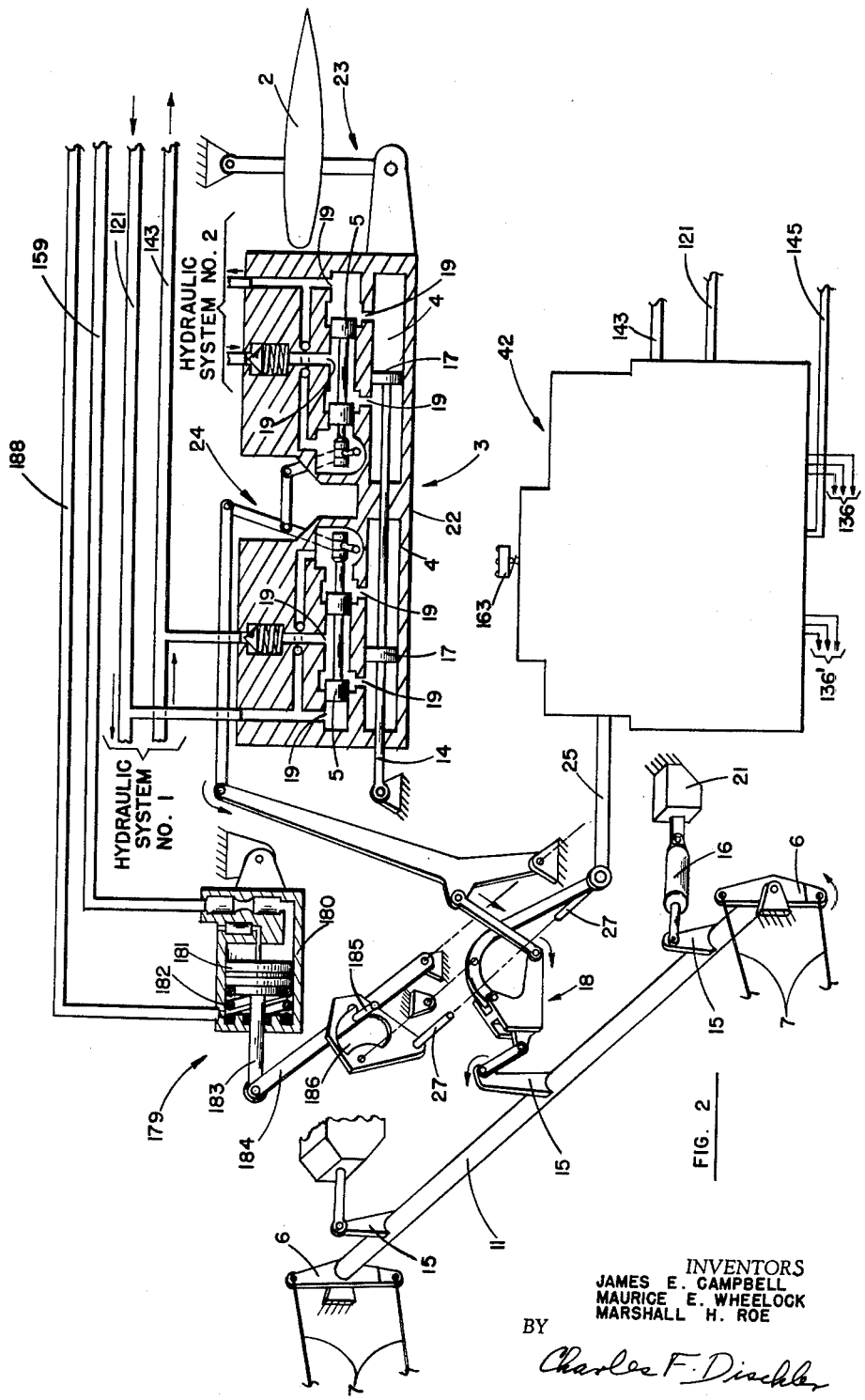

In the present embodiment the entire horizontal stabilizer is hinged to the lower part of the rear fuselage section and is integrally moved by a tandem-cylinder type hydraulic actuator 3 to provide longitudinal control of the aircraft. However, it is to be understood that this invention is equally applicable to aircraft having a fixed horizontal stabilizer surface with a movable elevator for longitudinal control. As best shown in FIG. 2, each chamber portion 4 of the hydraulic actuator is powered at the same time by a separate one of two independent flight control hydraulic power systems. Failure of either of the hydraulic systems does not render the actuator inoperative, since the longitudinal surface may be controlled by the remaining hydraulic system. The actuator control valves 5 are synchronously interconnected by a linkage 24 so that they operate at the same time in the same manner. Moving the valves to open position allows application of fluid pressure into the corresponding ends of each of the two tandem cylinders and connects the other ends of the cylinders to the return system. Since the piston rod 14 is attached to rigid structure of the aircraft and the actuator cylinder body 22 is attached to the control surface 2 by means of appropriate linkage 23; application of pressurized fluid to the same sides of the tandem mounted pistons 17 causes movement of the actuator body. This movement is transmitted through the linkage 23 to the control surface 2 to position the surface in accordance with the direction and amount of movement of the actuator body. Movement of the actuator also returns the control valves 5 to neutral, keeping the fluid in the actuator trapped and preventing any further movement of the actuator or control surface until the valves 5 are repositioned. The control surface hydraulic systems thus are irreversible in character in order to maintain desirable handling characteristics throughout the speed range of the airplane. Therefore, no aerodynamic loads of any kind can reach the pilot through the controls. Because of this hydraulic irreversibility, bungee artificial feel system 16, connected between the stick and the stand-by trim actuator 21, simulates proper aerodynamic forces and provides pilot feel in the controls in a manner well know in the art.

The basic mechanical, pilot-operated control system, as shown in FIGS. 1 and 2, is a dual system of levers 6, cables 7, push-pull rods 8, bellcranks 9 interconnecting a forward torque tube 10 and an aft torque tube 11. Control stick 12 is attached to torque tube 10 and fore and aft movement of the control stick is transmitted through the cable and linkage system to correspondingly move the aft torque tube and achieve longitudinal control. For clarity, only one portion or side of the dual linkage system is shown in the schematic view of FIG. 1. A duplicate linkage system is connected to the far ends of the torque tubes to provide a symmetrical linkage system. The aft torque tube is connected through a nonlinear linkage 18 to the hydraulic actuator control valves 5. Thus, movement of the control stick by the pilot actuates the control valves to allow hydraulic fluid to motivate the hydraulic actuator 3 to position the control surface in accordance with the direction and amount of control stick movement. Static balance of the mechanical control system may be controlled by the use of balance weights, which are not shown.

Since the stabilizer hydraulic actuator body 22 is connected to the stabilizer 2 and movable therewith and the actuator piston is connected to the fixed structure of the aircraft, a follow-up action results causing the pressure supply and return ports of the actuator cylinder to be closed when the desired stabilizer position is reached.

With this cable and linkage system, illustrated in FIGS. 1 and 2, moving the control stick rearwardly causes the aft torque tube 11 to rotate in a clockwise direction. This moves the torque tube arms 15 aft, compressing the artificial feel springs in bungee 16 and moving the stabilizer hydraulic actuator control valves 5 aft, which directs hydraulic pressure to the aft side of the actuator pistons 17 and opens the forward side of the actuator to return. Since the piston rod 14 is attached to fixed aircraft structure, the hydraulic pressure forces the actuator body 22 aft, moving the stabilizer leading edge downwardly. When the control stick stops moving the control valve also ceases to move. Since the control valve body is integral with the actuator body and the actuator body continues to move under the applied pressure, the actuator cylinder ports 19 catch up with and are shut off by the now stationary control valve spools 5. Thus, when the desired aircraft attitude in the longitudinal plane is established, the pilot stops the stick movement which in turn recenters control valves 5 to a static neutral position, thereby holding the hydraulic cylinder and surface in this position. From the above, it is evident that the pilot is required to apply a definite force to initiate and hold a control surface deflection. The force that is necessary to thus deflect the control surface of an unaugmented longitudinal control system depends on altitude and Mach number.

Releasing the control stick after having moved it fore or aft allows the bungee springs to return the stabilizer control system to its trimmed (bungee neutral) position. For the case described above where the control stick had been moved aft, the stabilizer torque tube 11 would be rotated counterclockwise, viewed as in FIG. 1, upon release of pressure on the stick. This moves the torque tube arms 15 and the stabilizer hydraulic actuator control valve spools 5 forward. Moving the control valve spools forward directs hydraulic pressure to the forward side of the actuator pistons 17 and opens the aft side of the actuator pistons to return. Since the piston rod is attached to fixed structure, hydraulic pressure forces the actuator body forward, moving the stabilizer leading edge up, until the trimmed (bungee neutral) position of the stabilizer is reached. When the trimmed position is reached, the torque tube ceases to be rotated. This stops movement of the control valve spools and allows the actuator cylinder ports 19 to catch up with and be shut by the valve spools 5 to stop stabilizer movement. Forward stick movement results in counterclockwise movement of the aft torque tube with the resultant movement of the actuator linkage shown by the arrows in FIG. 2.

The augmented control system as disclosed herein is specifically applied to the longitudinal or pitch control surfaces of an aircraft but the inventive concept is equally applicable to other control surfaces such as the vertical stabilizer or the ailerons to achieve optimum directional or lateral control and stability dependent on the selection of the aerodynaic parameters involved. Hereafter the augmented longitudinal control system of this invention will be denoted by the letter abbreviation ALCS.

Figure 3:
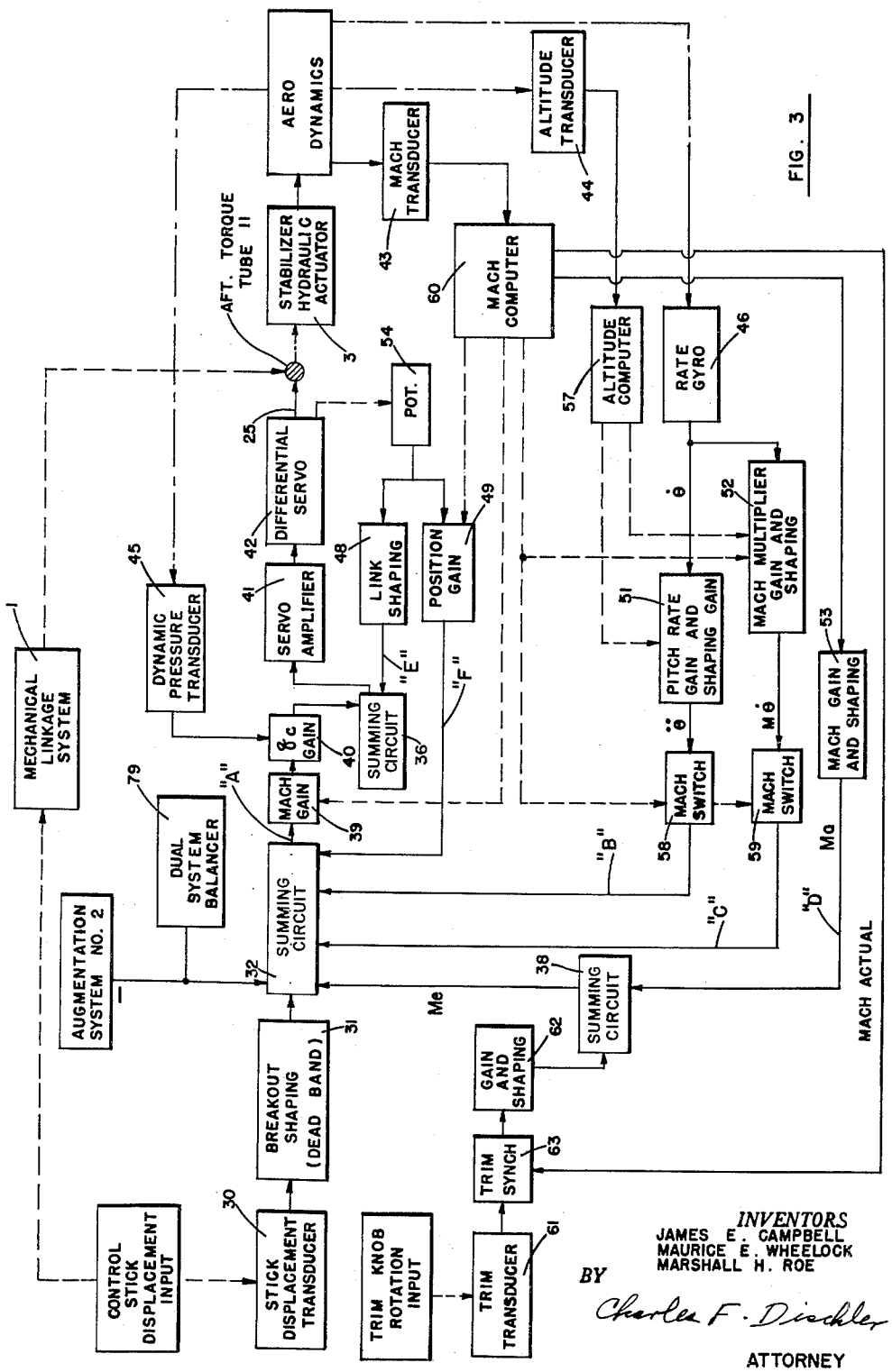
FIG. 3 is a diagrammatic showing of the augmented longitudinal control system of this invention.

As shown in FIG. 3, the augmentation system comprises a forward loop "A" consisting of a stick displacement transducer 30 which converts the control stick input movement into an electrical signal voltage having an amplitude proportional to the amount of stick movement, a breakout shaping circuit 31, summing circuit 32 which allows the introduction of modifying signals, dynamic stability shaping units comprising Mach gain and dynamic pressure gain circuits 39 and 40, respectively, servo amplifier 41, and an electrohydraulic integrating differential servo 42 including a piston rod 25, movable in response to the modified signal voltage output of circuit "A" and which is connected to the horizontal stabilizer by means of the nonlinear linkage 18 and hydraulic actuator 3. Summing circuit 32 comprises resistances connected in parallel to allow the introduction of electrical feed-back signals, at the correct voltage, at a common node point in the system. These feedback voltage signals are transmitted from the aerodynamic parameter compensating circuits, after modification therein in a scheduled manner, in accordance with the varying aerodynamic characteristics of the aircraft.

The pilot input signal voltage is modified by feed-back signals which are functions of the changes in the aerodynamic parameters occasioned by any transient accelerations or decelerations in the longitudinal plane of the aircraft. The actual aircraft response to any positive or negative transient acceleration conditions in the longitudinal plane is measured by Mach transducer 43, altitude transducer 44, dynamic pressure transducer 45, and pitch rate gyro 46. The amplified and shaped input signals of these transducers and of the rate gyro are added to or subtracted from the pilot input signal in a manner to provide dynamic and static longitudinal stability, pitch damping, constant stick force and constant stick displacement per unit "$g$" to maintain any desired Mach number and to improve the dynamic response of the system. Under steady state conditions, such as unaccelerated level flight, the aerodynamic input to the pitch rate gyro 46 is zero and thus there is no vertical acceleration feed-back signal in loop "B" or loop "C" to the basic command circuit.

The forward loop "A" is an electrohydraulic system which translates the control stick input displacement into an electrical voltage signal by means of the stick force transducer 30 and after correction for variations in Mach number and dynamic air pressure and amplification of the signal applies it to differential servo 42, to effect operation of the hydraulic pistons 109 and 110 contained therein, in accordance with such signals. The servo device may be considered as an extensible link since it includes a piston rod 25, integral with pistons 109 and 110 as shown in FIG. 7, that is mechanically connected to motivate the control surface hydraulic actuator through the nonlinear linkage 18 as shown in FIG. 2. In the disclosed embodiment stick displacement is preferably measured by a transducer 30 having a linear characteristic (for a fighter-bomber type aircraft 0.75 inch displacement per "$g$" has been found suitable) to produce an output signal whose magnitude is directly proportional to stick displacement. The augmentation system, preferably, also includes a breakout shaping or deadband circuit 31 which prevents transmission of the signal below a predetermined threshold level, here set at 0.1 inch of stick movement. This deadband prevents action of the forward loop in response to every slight movement of the control stick. Upon a control stick movement sufficient to result in a signal exceeding the preset minimum threshold level, the stick displacement signal is then transmitted to forward loop circuit "A." In this circuit the input signal voltage is first modified by the output signal voltage from Mach gain circuit 39. This Mach corrected signal is then further corrected by dynamic pressure gain circuit 40 and then transmitted to servo amplifier 41. The amplified and corrected stick displacement signal is then applied to operate the electrohydraulic differential servo 42 in accordance with such signal. Mach gain circuit 39 modifies the stick displacement signal to correct for variations in the speed of the aircraft while the dynamic pressure gain circuit 40 modifies the signal in accordance with variations in the impact or velocity pressure $q_c$ as the aircraft varies in speed and altitude. These gain circuits provide optimum dynamic response characteristics to the command circuit by applying corrections for speed and altitude to the loop error signal to assist in achieving constant dynamic characteristics of the aircraft.

The basic mechanical control system and the electrical augmentation system normally act substantially simultaneously in parallel to add together to operate the control surface actuator 3. However, the electrically controlled augmentation system is more powerful than the mechanical system and can add to or subtract from the mechanical system. If either the basic mechanical system or the forward loop "A" is inoperative the other system will have full control over the movable control surface involved.

Pitch damping of the oscillatory modes and those forces that do not originate from the control stick is accomplished by means of loop "B" by measuring the aircraft angular pitch rate $\theta$, differentiating this pitch rate signal to find the pitch acceleration signal $\ddot{\theta}$, applying a correction for altitude, and applying the resultant signal as a negative feed-back signal $\ddot{\theta}$ to the system through summing circuit 32. The negative feed-back signal thus subtracts algebraically from the command signal, if any, to provide an error signal, the integral of which is proportional to the amount of stabilizer deflection required to counteract and damp the aircraft pitching motion.

The rate of pitch is measured by a rate gyroscope 46 which is attached to the aircraft structure and disposed in a manner to detect the angular velocity $\theta$ of the aircraft about the Y-axis which is a line normal to the aircraft plane of symmetry. The electrical signal voltage generated by gyro 46 in response to such angular movement is proportional in magnitude to the angular pitch velocity $\dot{\theta}$. This pitch signal is transmitted to the pitch rate gain and shaping circuit 51. To achieve uniformity and correct for variations in altitude a signal corresponding to the altitude at any instant is transmitted from altitude transducer 44 through the altitude computer 57 to pitch rate gain and shaping circuit 51 and applied to the angular pitch velocity signal $\dot{\theta}$. The altitude corrected signal is differentiated in circuit 51 and is then applied to the command signal at summing circuit 32 to subtract therefrom algebraically in a manner to cause differential servomechanism 42 to position the horizontal stabilizer to damp the aircraft pitching motion.

Upon movement of the control stick, stick displacement transducer 30 generates a command voltage signal that is a measure of the desired acceleration normal to the aircraft flight path. During the transient period of such a normal acceleration in the longitudinal plane of the aircraft the actual acceleration normal to the aircraft flight path is computed in loop "C" and the resultant signal is fed back through summing circuit 32 in a manner to subtract from the desired normal acceleration signal and produce a normal acceleration error signal that will achieve a constant stick force and constant stick displacement per unit of normal acceleration "g."

In general the acceleration of an aircraft along the Z-axis, or in a direction normal to the aircraft direction of flight, may be represented by the expression $$\Delta n_Z = \frac{V}{g}(\dot{\theta} - \dot{\alpha})$$

where $\Delta n_Z$ is the incremental normal load factor (acceleration in "g" units), V is the speed of the aircraft, $\dot{\theta}$ is the angular pitch rate of the aircraft about its center of gravity, $\dot{\alpha}$ is the angular velocity of the changing angle of attack and "g" is the unit of gravitation acceleration. The $\dot{\alpha}$ term is approximately equal to $K_1 \Delta \dot{n}_Z$, where $K_1$ is a constant dependent on flight conditions. When this expression is substituted for $\dot{\alpha}$ in the equation for $\Delta n_Z$ the following equation results:

$$\Delta n_Z + \frac{V}{g} K_1 \Delta \dot{n}_Z = \frac{V}{g} \dot{\theta}$$

Using Laplace notation the expression becomes $$\Delta n_Z = \frac{\frac{V}{g}\dot{\theta}}{\frac{V}{g}K_1 s + 1}$$

where $$\frac{V}{g} K_1$$

is the effective time lag between aircraft pitch rate and normal acceleration. Under steady flight conditions, i.e., when $\dot{\alpha}$ is zero, the above equation reduces to $$\Delta n_Z = \frac{V}{g}\dot{\theta} = KM\dot{\theta}$$

where K is a constant and M is the Mach number. The signal corresponding to the product of $M\dot{\theta}$ is the quantity that is shaped as a function of altitude and amplified in circuit "C" and applied as a degenerative feed-back signal to the basic pilot input signal in forward loop "A."

The actual acceleration normal to the flight path is measured by combining the pitch rate signal from gyro 46 with signals from altitude gain transducer 44 and Mach computer 60 in a multiplier gain and shaping network 52 to produce a feed-back signal proportional to the time lagged product $M\dot{\theta}$ ($M\dot{\theta}$ signal put through a time lag network). The lagged product of the Mach number and pitch rate may be replaced by the signal from a normal accelerometer if desired. The negative feed-back signal is thus a measure of the actual normal acceleration of the aircraft in the longitudinal plane, relative to the aircraft flight path. This negative feed-back signal is subtracted from the desired normal acceleration signal to produce an acceleration error signal which is corrected for dynamic pressure and Mach number variations in forward loop "A," amplified in servo amplifier 41 and applied to the differential servo to reposition it in a manner to move the longitudinal control surfaces to achieve the desired normal acceleration of the aircraft while maintaining a constant stick force and constant stick displacement.

The gradient of the curve of stick force versus speed, $dFs/dV$, is important since it plays a major role in determining the pilot's feel of the aircraft, i.e., the pilot's concept of its speed stability. A large gradient will tend to keep the airplane flying at constant speed and will resist the influence of disturbances toward changing the speed. Mach gain and shaping circuit "D" of the ALCS provides a stick force versus speed curve having a linear characteristic to ensure constant speed stability of the aircraft. A signal from the Mach transducer 43 and computer 60, which is dependent on the aircraft speed, is shaped and amplified in the feed-back circuit "D" by Mach gain and shaping circuit 53 to provide this linear force versus speed characteristic. The Mach gain and shaping circuit 53 provides constant speed stability as well as damping of the long period aircraft motions by shaping the Mach signal in accordance with the transfer function $$\left(\frac{\tau_1 S + 1}{\tau_2 S + 1}\right)$$

where S is the Laplace transform operator and $\tau_1$ and $\tau_2$ are constants of the lead-lag shaping network which provides the desired damping of the long period mode. The shaped and amplified Mach number signal from loop "D" is applied as a negative feed-back signal to the command signal at summing circuit 32 to modify the amplitude thereof so as to produce a constant function of stick force vs. speed gradient.

To improve the overall dynamic response of the ALCS system by substantially cancelling the lag inherent in the operation of the stabilizer hydraulic actuator, a link shaping circuit "E" is provided. This circuit is of the washed-out follow-up type which provides a rate follow-up to introduce a predetermined amount of lead into the basic forward loop "A" to effectively cancel the hydraulic actuator lag. A voltage signal corresponding to the equivalent horizontal stabilizer position is produced by a position-pickoff potentiometer 54, the wiper arm of which is mechanically connected to extensible link differential servo 42 and which generates a voltage signal proportional in magnitude and polarity to the servo position about a neutral point and hence proportional to the horizontal stabilizer position. This voltage signal is introduced into forward loop "A" at summing circuit 36 after appropriate shaping, dependent upon the desired system characteristics, in shaping circuit 48.

To ensure proper ground and low speed operation the longitudinal control of the aircraft is accomplished entirely by direct pilot control of the horizontal stabilizer. For this purpose a stabilizer position-gain circuit "F" is provided. This circuit modifies the system characteristics during the low speeds of takeoff and landing, in order to control the stabilizer position instead of controlling and maintaining the aircraft "g" value. Loop "F" also minimizes the possibility of injury to ground personnel by inadvertent operation of the sensitive but powerful electrohydraulic command loop while the aircraft is on the ground. The output signal of the pickoff potentiometer 54 is also modified in a scheduled manner in link position gain circuit 49 by an input from Mach computer 60 in a manner shown in FIG. 6 to produce a feed-back signal of a magnitude and phase relation that will give the desired stabilizer control in the 0–0.5 Mach number range. This signal is then introduced into the basic command loop through summing circuit 32.

Figure 6:
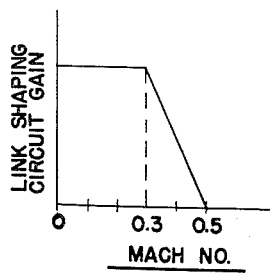
FIG. 6 is a graph of the response characteristic of the extensible link position follow-up circuit.

As seen from the curve of FIG. 6 the gain of the link position signal is maintained at a constant level up to Mach 0.3 and then decreases linearly down to a zero value at Mach 0.5. The range between Mach 0.3 and Mach 0.5 constitutes a transition period during which the stick displacement signals are cancelled by a combination of the link position and aerodynamic feed-back signals as the aircraft accelereates or decelerates and the aerodynamic forces in the longitudinal plane are changing.

Below a Mach number of 0.3 circuits "B" and "C" are inoperative but at Mach 0.3 pitch-damping feed-back circuit "B" and normal-acceleration feed-back circuit "C" are cut in by the Mach operated switches 58 and 59, respectively, which close at this Mach number to allow completion of the "B" and "C" circuits, and the stabilizer link-position signal starts to diminish. Thus the aerodynamic-parameter feed-back circuits become operative at a Mach number of 0.3. For ground operation and speeds below Mach 0.3 the stabilizer displacement is the sum of the displacement due to the mechanical input and the displacement due to the electrical input, by the pilot.

Above Mach 0.5 the stick displacement transducer signal is compared to a signal corresponding to the altitude-corrected pitch acceleration $\ddot{\theta}$ as well as the lagged signal voltage $M\dot{\theta}$ which is the time lagged product of the pitch rate gyro and Mach transducer signal voltages, as previously described. Mach switches 58 and 59 in circuits "B" and "C," respectively, are mechanically connected to Mach computer 60 to open at 0.3 Mach number.

Position trim of the system, with the ALCS operating normally, is provided by rotation of trim knob 20, located on the control stick, to produce a signal voltage corresponding to the desired change in Mach number. This desired Mach number signal ($M_d$) is compared to the shaped Mach number signal ($M_a$) of circuit "D" at summing circuit 38 and the difference or error signal ($M_e$) is applied to forward loop "A" summing circuit 32 to move the differential servo accordingly. The stabilizer continues to move until the actual Mach number signal cancels the trim signal ($M_d$). This puts the aircraft in the desired attitude. Another possible method of system operation would be for the pilot to hold the aircraft in one "g" flight during changing speed conditions by correct motion of the stick. When a new speed condition was reached a signal from the trim knob would be used to replace the signal due to stick displacement and thus achieve a new "hands off" trim condition. It is noted that the signals due to stick displacement or trim knob rotation produce identical effects on aircraft response. Rotation of the trim knob operates trim transducer 61 to produce a voltage signal proportional to knob rotation. This signal is transmitted to trim synchronizer 63 and then to gain and shaping circuit 62. The resultant desired Mach number signal from trim synchronizer 63 is combined with the actual Mach signal as modified in gain and shaping circuit "D" to produce the trim error signal. When the aircraft is in the desired attitude the trim error signal is zero. This portion of the system thus provides the functions of pitch trim and Mach number hold.

It should be noted that achieving pitch trim in the manner set forth above does not alter the neutral (no-load) position of the control stick. In the event of failure of the augmented control system, pitch trim can be accomplished by standby pitch trim unit 21 by repositioning nonlinear actuator linkage 18. Standby pitch term actuator 21 is of the electric motor driven screwjack type and may be operated in case of emergency to provide a manual term action by means of a standby trim button on the pilot's console.

Figure 4:
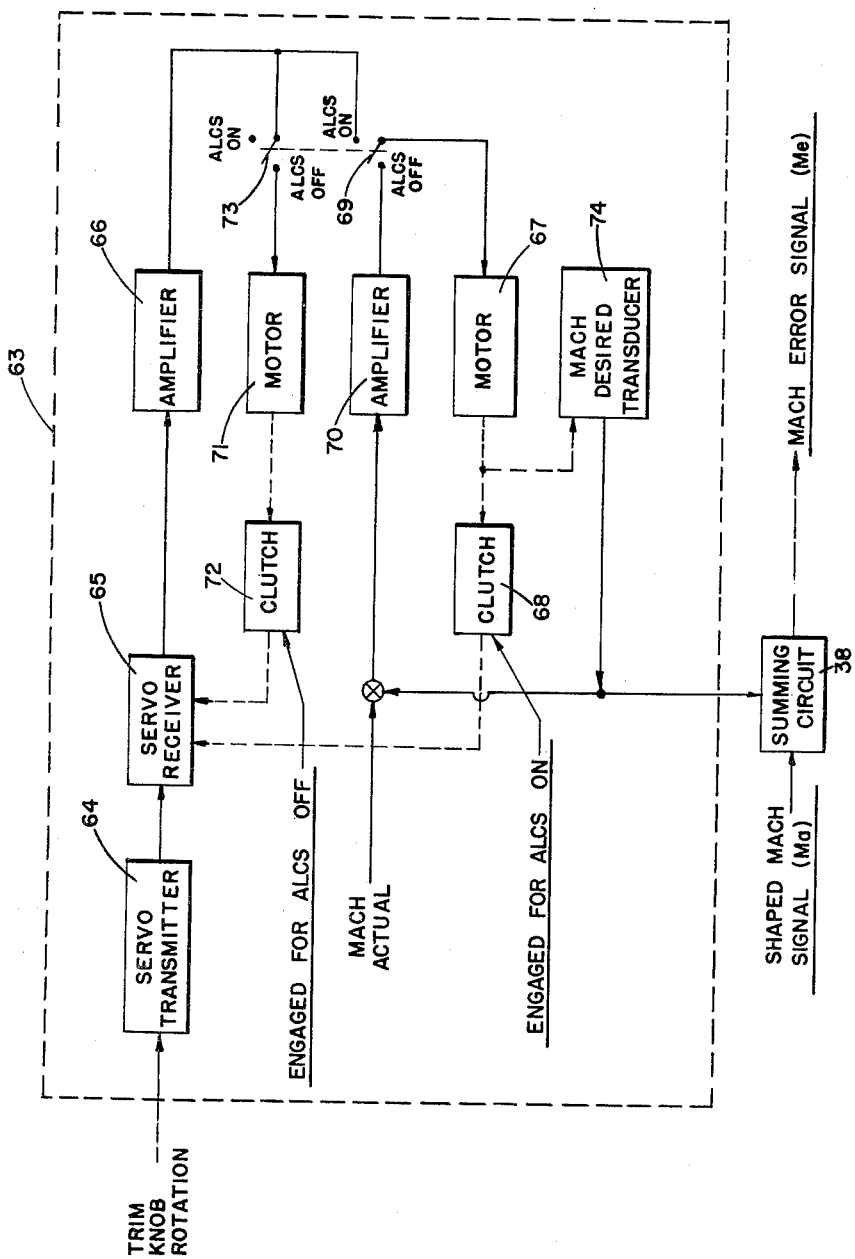
FIG. 4 is a diagrammatic showing of the trim synchronizer portion of the system.

As shown in FIG. 4, trim synchronizer 63 comprises a servo transmitter 64 and servo receiver 65 forming a closed servo loop. With the ALCS "on" and operating normally, the trim knob input signal is transmitted through the servo loop to amplifier 66 and then applied to motor 67 through switch 69. Motor 67 is mechanically connected to servo receiver 65 through clutch 68, which is engaged when the ALCS is operating. Motor 67 drives servo receiver 65 to cancel the trim input signal and, consequently reduce the error signal voltage to amplifier 66 to zero. Simultaneously, motor 67 positions the wiper arm on the potentiometer of the Mach desired transducer 74 as a function of trim knob rotation to produce a Mach desired signal. This signal is compared with the actual Mach number signal from Mach computer 60 and the difference, or Mach error signal ($M_e$) is introduced into the system through summing circuits 38 and 32. With the ALCS operating switches 69 and 73 in the "on" position, amplifier 70 and motor 71 are inoperative.

With the ALCS "off" and switches 69 and 73 in the "off" position, the Mach error signal is amplified in amplifier 70 and applied to motor 67 to drive the wiper arm from the Mach desired potentiometer 74 in a direction to reduce the Mach error signal to zero. The output signal from the trim knob is amplified in amplifier 66 and applied to motor 71 which in turn drives the synchro receiver 65 to zero output by means of a mechanical connection and clutch 72.

Thus, with the ALCS "on" the trim synchronizer unit is purely a repeater servomechanism which positions the Mach desired potentiometer in proportion to the trim knob position. With the ALCS "off" or used in conjunction with an autopilot mode of operation other than Mach "hold," the trim synchronizer operates to prevent transients from occurring when the ALCS is engaged or a Mach "hold" autopilot mode is selected. This is done as described above by keeping the Mach error signal zero and the output of amplifier 66 zero.

The ALCS is electrically dual with one system monitoring the other to detect improper signals. An intolerable difference between the outputs of the two systems will cause both systems to shut off and the differential servo will be automatically returned to "neutral" by centering actuator 179. Similarly, electrical or hydraulic power failure will be detected by a power monitor (not shown) which will cause automatic shutdown and recentering of the differential servo.

Figure 5:
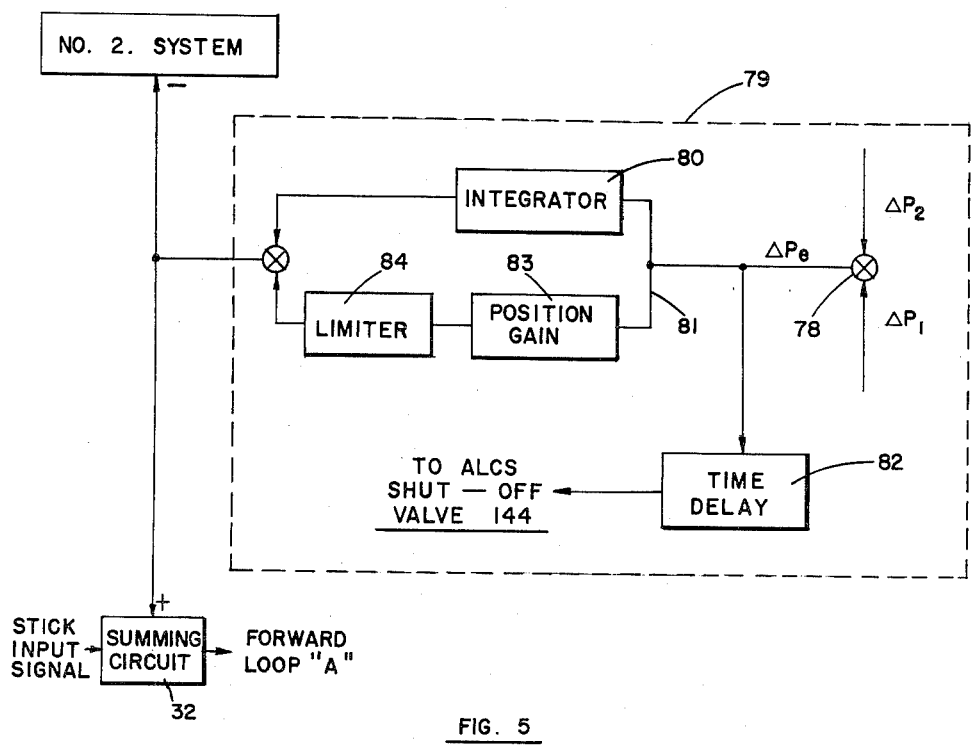
FIG. 5 is a diagrammatic view of the dual system balancer of the invention.

FIG. 5 is a diagram of the dual system balancer 79 which has as its function the task of making the two ALCS systems look alike, i.e., it takes out any error in the system by keeping the pressures on either side of extensible link pistons 109 and 110 balanced. The differential pressures across each of pistons 109 and 110 is measured by pressure transducers (not shown). The outputs of these differential pressure transducers, $\Delta_{P_1}$ and $\Delta_{P_2}$, respectively, are fed into balancer 79 through comparator 78 in a manner such that any unbalance in pressure, $\Delta_{P_e}$, results in an input signal to the system, thereby reducing the unbalance to zero, with integrator 80 limiting the balancer output to 0.5 "g" per second for a hardover signal in one channel of the dual system, while the limited position loop 81, comprising position gain circuit 83 and limiter circuit 84, provides tighter loop control for inputs to the system.

The dual system balancer is basically a device for equalizing the performance of the two independent systems to prevent small gain or unbalanced differences from causing nuisance shutoffs without impairing the fail-safe feature provided by the system duality. Due to manufacturing tolerances, ageing of components and the like, differences between $\Delta_{P_1}$ and $\Delta_{P_2}$ can exist. Without the balancer, the two systems would try to fight each other, degrading the differential servo response and producing sufficient pressure differential $\Delta_{P_e}$ to cause a shutoff. With the balancer, this situation is eliminated. Referring to FIG. 5, if $\Delta_{P_2}$ is greater than $\Delta_{P_1}$, $\Delta_{P_e}$ is positive and the balancer integrator 80 will supply inputs that decrease $\Delta_{P_2}$ and increase $\Delta_{P_1}$, thus driving the differential pressure $\Delta_{P_e}$ to zero. When this condition is reached integrator 80 holds the outputs existing at that time, which are those required to hold $\Delta_{P_e}$ equal to zero. A hardover failure in system 2 will cause a maximum $\Delta_{P_2}$ and a maximum opposing $\Delta_{P_1}$. The differential pressure $\Delta_{P_e}$ will be twice as big as either $\Delta_{P_1}$ or $\Delta_{P_2}$ and the ALCS will be shut off by time delay unit 82 if this large $\Delta_{P_e}$ exists for a period of two seconds. Time delay unit 82 operates solenoid shut-off valve 144 to close fluid supply conduit 145 and inactivate the differential servo 42. During this two-second interval, the differential servo 42 will be moving at a rate sufficient to produce an aerodynamic load of 0.5 "g" per second on the airplane.

In the foregoing circuits, the transducers utilized for measurement of the pertinent aerodynamic parameters such as Mach number, dynamic pressure and altitude, as well as the pitch rate gyroscope and Mach number computer, are all devices that are exceedingly well known in the art and obtainable as standard commercial items, therefore, no detailed description of these mechanisms is included herein. These parameters are supplied from the transducers, gyroscope and Mach number computer either as electrical signals or mechanically by means of shaft rotations and mechanical linkages which are used to operate wiper arms on specific function or nonlinear potentiometers to vary the signal voltages in the different circuits in accordance with variations in the appropriate aerodynamic parameters. The output of rate gyro 46 is transmitted electrically to multiplier and shaping circuit 52 and to pitch rate amplifier 51 in the normal-acceleration circuit "C."

The gain of pitch-damping circuit "B," normal-acceleration circuit "C," as well as the Mach number and dynamic pressure circuit gain in the forward loop "A" and the gain in servo amplifier 41 may all be achieved by the use of standard vacuum tube amplifiers or transistor circuits in a manner old and well known in the art. Similarly, the multiplier circuit of loop "C," integrator 80 and limiter 84 are well known in the electronic art and are not shown in detail.

The desired command signal of circuit "A," either unmodified or as modified by one or more augmentation signals corresponding to aerodynamic parameters in the longitudinal plane, is transmitted from servo amplifier 41 and applied to the ALCS electrohydraulic differential servo 42 which rotates torque tube 11 and thereby repositions the control surface 2 in conformance with such modified signal. As shown in FIG. 7, servo 42, in general, comprises a tandem dual-cylinder hydraulic actuator 100, hydraulic control valves 101 and 101', each of which is controlled by one of electromechanical valves 103 and 103', respectively, blocking valves 105 and 105', and the associated interconnecting conduits.

More specifically servo actuator 100 includes two axially aligned cylindrical chambers 107 and 108 having pistons 109 and 110, respectively therein, which are joined by a common piston rod 25. This output piston rod is connected by nonlinear linkage 18 to the stabilizer hydraulic actuator control valves 5 and movement of the rod 25 causes these valves to either open or close, depending on the direction of such movement, thereby actuating the stabilizer surface.

The hydraulic servo internally comprises a dual system with identical duplicate elements, one for operation with each of the two similar but independent augmentation systems. For this reason the blocking valve 105, the extensible-link hydraulic control valves 101 and the electromechanical valves 103 of only one system will be described in detail.

Figure 8:
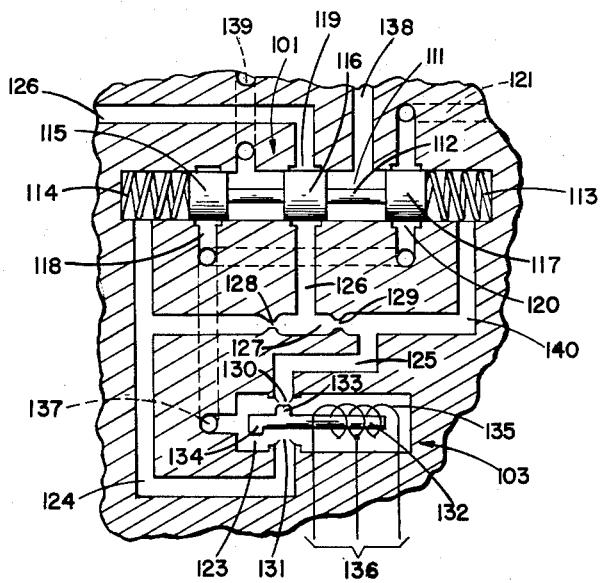
FIG. 8 is an enlarged view of a portion of FIG. 7 showing the hydraulic actuator control valve and the electromechanical control valve in detail.
Figure 11:
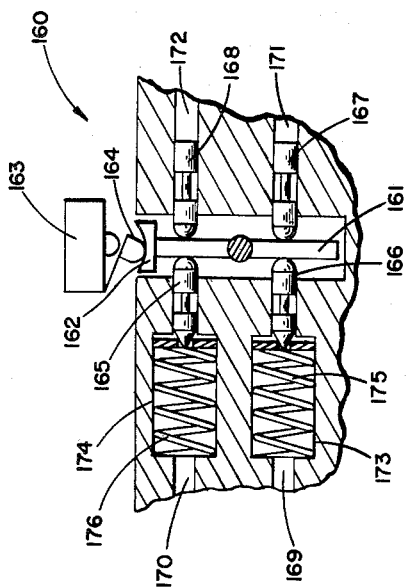
FIG. 11 is an enlarged view of the differential pressure cutoff switch mechanism of the differential servo.
Figure 10:
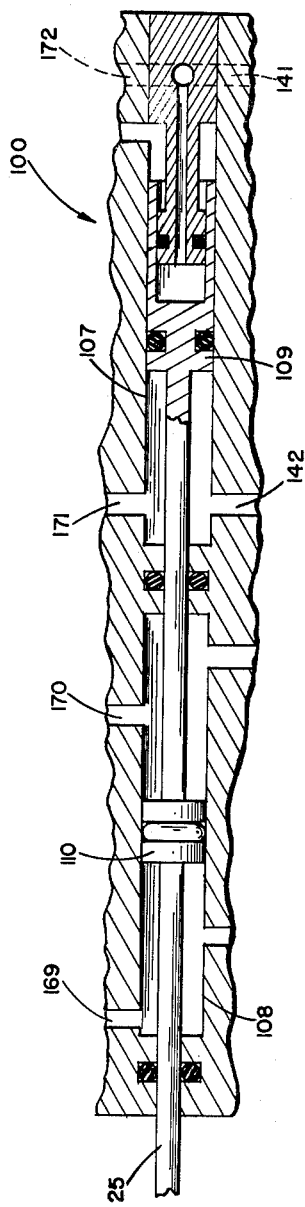
FIG. 10 is an enlarged view of the hydraulic actuator portion of the differential servo.

As shown in the enlarged view of FIG. 8, control valve 101 comprises a cylindrical chamber 111 having a valve spool 112 normally held in a central neutral position therein by springs 113 and 114 at each end of the chamber. Valve 112 has three axially spaced lands 115, 116, and 117, which cover three annular pockets or grooves, 118, 119, and 120, which are formed in the chamber wall, when the valve is centered in its neutral position. Lands 115 and 117 formed on the outer ends of the valve body 112 cover the exhaust grooves 118 and 120 while the intermediate land 116 covers the inlet groove 119 when the valve body is in its neutral centered position. Annular grooves 118 and 120 are connected to the hydraulic system return line 121. Electromechanical valve 103 comprises a solenoid operated valve 123 which is shown as being axially movable in response to the voltage signals transmitted thereto from the servo amplifier, although it may also be of a flapper or reed type. Electromechanical valve 103 is connected to each end of the hydraulic control valve 101 by conduits 124 and 125. Inlet groove 119 is connected to conduits 124 and 125 by conduits 126 and 127 with throttling orifices 128 and 129 restricting the flow through conduit 127 and creating a pressure differential across the orifices. The ends of pressure conduits 124 and 125 terminate in nozzles 130 and 131 within the chamber of valve 123.

Valve 123 contains a solenoid operated valve spool 132 having offset baffles 133 and 134 on opposite sides adjacent nozzles 130 and 131, respectively. When the solenoid coil 135 is energized from amplifier 41 through connecting wires 136, in accordance with the shaped and amplified signal from circuit "A," spool 132 is moved in a manner corresponding in direction and amount to the polarity and magnitude of the signal. Sufficient movement of the spool in one direction or the other moves one or the other of the baffles 133 or 134 into proximity to its respective nozzle 130 or 131. This restricts the flow from the adjacent nozzle into valve 123 and the return conduit 137 with a consequent increase in back pressure in the flow restricted line. As shown in FIG. 8, the flow of hydraulic fluid from nozzle 130 is throttled by baffle 133 and the pressure then increases in conduit 125 and on the right end of valve body 112. This unbalances the valve and causes it to move to the left thereby placing pressure conduit 126 in communication with conduit 138. Conduit 139 then becomes the return conduit from the link actuator 100 through conduits 118, 120 and 121. Upon movement of valve spool 132 in a reverse direction in response to a signal voltage of opposite polarity the flow from nozzle 131 will be throttled by baffle 134 and the pressure increased on the left end of valve spool 112 thereby driving it to the right and placing pressure conduit 126 in communication with conduit 139 and connecting conduit 138 to return line 121. The amount of throttling of nozzle 130 or 131 is dependent upon the variable signal from servo amplifier 41 and may be infinitely varied from the limiting positions of unrestricted flow to fully throttled flow in which position the baffle is directly opposite but not touching or closing the nozzle. It should be noted that when valve spool 112 is centered in chamber 111 hydraulic fluid circulates continuously through this portion of the servomechanism. Hydraulic fluid under a preferred pressure of approximately 1500 p.s.i. flows into the system from conduit 143 through conduit 126, around central land 116 by means of annular groove 119 and then through conduits 126, 127, 125 and 124, and unrestricted nozzles 130 and 131 into electrohydraulic valve 123. The fluid returns through conduit 137, around land 117 by means of annular groove 120 and thence to return line 121. Conduits 138 and 139 connect to conduits 141 and 142, respectively, through the normally open blocking valve 105 and allow access of pressurized hydraulic fluid to either end of the actuator chamber 107 in accordance with the signal applied by the servo amplifier to solenoid valve 123. Continuous application of pressurized fluid to one side or the other of each of pistons 109 or 110, in response to the signal transmitted to valves 103 and 103' from the forward loops "A" and "A'" and their associated augmentation systems, thus moves piston rod 25 to continuously reposition horizontal stabilizer surface 2 in response to the signals, dependent on the longitudinal aerodynamic parameters, to provide a constant control stick force and displacement per unit "g," pitch damping, and static and dynamic longitudinal stability generally. It should be noted that baffles 133' and 134' on valve spool 132' of electromechanical valve 123' are disposed in the same relation as baffles 133 and 134 on valve spool 132. Thus control valve 112' moves in the same direction as control valve 112 and supplies pressurized fluid to the side of piston 110 in correspondence with and in a manner to add to the force created on the similar side of piston 109 by the admission of pressurized hydraulic fluid from valve 112.

Figure 9:
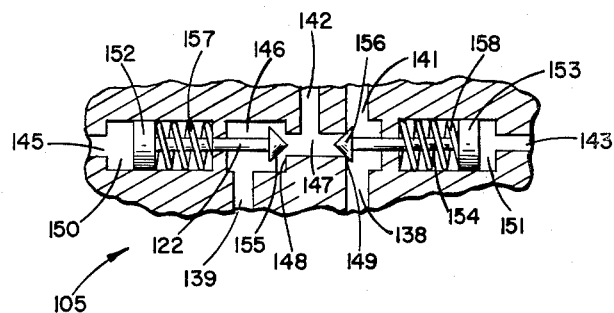
FIG. 9 is an enlarged view of the blocking valve portion of the differential servo.

To prevent movement of the stabilizer past predetermined limiting positions blocking valves 105 and 105' are provided to hydraulically lock the differential servo against movement. Bottoming switches (not shown) are positioned to be actuated when the stabilizer reaches its maximum desired limit of movement. Upon actuation the switches energize a normally closed solenoid-operated shutoff valve 144 to open and allow flow of high pressure hydraulic fluid into conduit 145 which communicates with blocking valve 105 and 105'. Blocking valve 105, as shown in FIG. 9, comprises a cylindrical chamber 146 having an intermediate portion 147 of a reduced diameter cross section, the shoulders of which form opposed valve seats 148 and 149. Axially aligned cylindrical chambers 150 and 151 are positioned one at each end of chamber 146 and have pistons 152 and 153, respectively, slidably mounted therein. Integral with pistons 152 and 153 are valve stems 154 and 122 extending into the enlarged end portions of chamber 146. Valve portions 156 and 155 on the ends of valve stems 154 and 122, respectively, are designed to seat on the annular valve seats 149 and 148, but they are urged to an open position by springs 158 and 157. Hydraulic fluid at a pressure of 1500 p.s.i. is continuously applied to the right side of piston 153 by means of conduit 143 which keeps valve 153 closed on seat 149. It should be noted that conduit 138 connects to conduit 141 through the end of this chamber without interference or flow interruption by this valve arrangement. Conduit 145 is normally blocked off from high pressure hydraulic fluid by solenoid shutoff valve 144. Upon energizing the solenoid coil of valve 144 by closing of the stabilizer bottoming switches or through a power failure, this shutoff valve is opened and a pressure of approximately 3000 p.s.i. is applied on the left side of piston 152, in a manner to close valve 155 on seat 148. Thus, the fluid pressure that normally acts on either side of the differential servo hydraulic actuator pistons 109, 110 is at a lower pressure than the pressures that may be applied to hold the blocking valve closed. Closing of the blocking valve results in closing conduit 142 and prevents flow of any fluid to or from the left end of chamber 107, thus effectively blocking movement of the piston 109. Blocking valve 105' acts in a similar manner relative to piston 110.

To provide a comparison point for detecting any failure in the system, whether electrical or hydraulic, which would affect the hydraulic pressure in the differential servo actuating cylinders, and accordingly shutoff the ALCS system, a differential pressure responsive mechanism 160 is provided. This device is acted upon by the pressures on each side of the two pistons 109 and 110 and is movable in response to a predetermined pressure differential across the pistons to operate a switch thereby energizing a circuit to close two solenoid valves in the hydraulic pressure supply line and render the ALCS inoperative.

Mechanism 160 comprises a pivotally mounted lever 161 having a cam surface 162 at one end with a normally open micro-switch 163 having a cam follower 164 contacting the cam surface and adapted to be actuated thereby to complete a circuit. Lever 161 is normally held in a neutral centered vertical position by pistons 165, 166, 167 and 168, each of which has one end in contact with the lever with the other end of each piston being acted on by the applied hydraulic pressure existing in one end or the other of chambers 107 and 108. The pressure from the ends of each of the chambers is transmitted to the other end of each of pistons 165, 166, 167 and 168 by conduits 169, 170, 171 and 172, respectively. Conduits 169 and 170 have enlarged portions 173 and 174, respectively, with coil springs 175 and 176 positioned therein to bias pistons 165 and 166 against opposite ends of lever 161. The springs prevent uncontrolled movement of the lever under low hydraulic pressures and exert a predetermined force which must be exceeded before the lever can be moved from its neutral position.

Mechanism 160 measures the pressure in the two chambers and applies any existing differential pressure above a predetermined value to pivot the lever 161 and thereby operate switch 163. This switch closes a circuit to energize solenoid valves 177 and 178 thereby closing hydraulic supply line 143.

Upon shutdown the differential servo is returned to neutral by a centering actuator 179, shown in FIG. 2. This actuator comprises a pivotally mounted cylinder 180 having a piston 181 with the system hydraulic fluid pressure applied to the right side of the piston by conduit 159 to move it to the left against the combined force of the return fluid pressure connected to the left end of the cylinder 180 by conduit 188 and biasing spring 182. Integral piston rod 183 is pivotally connected to one end of the lever 184 which is pivotally mounted to fixed structure at its other end. At an intermediate point on lever 184, a projecting pin 185 is arranged for arcuate movement within an interior cam cutout 186. Cam 186 is secured to the nonlinear valve linkage 18 by rod 27. When the centering piston 181 is acted on by the normal full hydraulic pressure of the system through conduit 159, lever 184 and pin 185 are moved to the left into the middle of the cam cutout 186. This allows unrestricted movement of the cam, nonlinear linkage and the hydraulic servomechanim. However, upon failure of the hydraulic system pressure or inactivation of the ALCS, as by closing of the solenoid shutoff valves 177 and 178 by mechanism 160, piston 181 moves to the right and pin 185 is brought to bear against the right side of cam 186 and and moves the cam and connecting linkage to center the extensible link in a neutral position. The manual control system may then be operated without any interference from the inactive ALCS differential servo.

As previously set forth, the ALCS is electrically dual, with one system monitoring the other by means of balancer 79 to detect improper signals. When the difference between the outputs of the two systems exceeds a predetermined amount, the ALCS is shut off and the differential servo will automatically be returned to neutral by the centering actuator 179. Electrical or hydraulic power failure will also operate relays (not shown) to cause automatic shut down and recentering.

In order to maintain the proper flight attitude while lowering or raising the flaps, an automatic trim shifter (not shown) may be provided. The differential servo 42 will act as the mechanical portion of the trim shifter and automatically control the deflection of the horizontal stabilizer in accordance with a scheduled flap trim shift input signal, which may be applied at summing circuit 32. For each increment of flap deflection there will be corresponding increment of stabilizer deflection. If at any time during the flap actuation the flap motion is reversed, the trim shifter input also reverses.

From the foregoing description, it will be evident that the augmented control system of this invention provides the pilot with constant stick control functions that are related to the longitudinal handling characteristics throughout the full range of flight conditions, as well as providing pitch damping of both long and short term oscillations.

While a particular embodiment of this invention has been illustrated and described herein, it will be apparent that various changes and modifications may be made in the construction and arrangements of the various parts without departing from the spirit and scope of this invention in its broader aspects, or as defined in the following claims.

We claim:
1. In combination with an aerial vehicle equipped with deviation producing means; a stabilization system comprising a pilot-operated control member; mechanical means for actuating said deviation producing means operable by movement of said control member; means for automatically augmenting said mechanical means including an electrically-operated hydraulic system in parallel with said mechanical means to independently position said deviation producing means, said augmentation means also being operable in response to movement of said control means.

2. In a stabilization system as set forth in claim 1 means for delaying actuation of said augmentation means during a prdetermined initial movement of said control member and the attached mechanical means.

3. In a stabilization system for an aerial vehicle such as an aircraft equipped with deviation producing means, a pilot-operated control member; mechanical means for actuating said deviation producing means operable by movement of said control member; means for automatically augmenting said mechanical means to actuate said deviation producing means including an electrically-controlled, hydraulically-actuated movable member mechanically in parallel with said mechanical means to independently position said deviation producing means, said augmentation means including means for automatically damping aerodynamic deviational forces tending to deflect said deviation producing means, said movable member also being operable in response to movement of said control means.

4. In a stabilization system for an aerial vehicle such as an aircraft equipped with deviation producing means, a pilot-operated control member; mechanical means for actuating said deviation producing means operable by movement of said control member; means for automatically augmenting said mechanical means including an electrically-controlled hydraulically-actuated extensible member in parallel with said mechanical means to independently position said deviation producing means, said augmentation means including means for automatically damping aerodynamic deviational forces tending to deflect said deviation producing means, said augmentation means further including means for actuating said extensible member to achieve a constant force and a constant displacement of the control member per unit of gravitational acceleration acting on the vehicle, said extensible member being operable in response to movement of said control means.

5. A stabilization system for an aerial vehicle such as an aircraft equipped with movable longitudinal deviation producing means comprising a pilot-operated movable control member having a neutral no-load position; a hydraulic actuator operatively connected to said deviation producing means and adapted to move the same; mechanical means interconnecting said hydraulic actuator and said control member for permitting the operation of said actuator and the connected deviation producing means in response to movements of said control member; means responsive to movement of said control member for automatically augmenting said mechanical means including an electrically-operated hydraulically-actuated extensible link in parallel with said mechanical means to independently position said deviation producing means, said augmentation means including means for automatically damping pitching forces, said augmentation means further including means for actuating said extensible link in response to the normal acceleration of the vehicle to produce a constant force and constant displacement of the control member per unit of gravitational acceleration force applied to the vehicle.

6. A stabilization system for an aerial vehicle such as an aircraft equipped with movable longitudinal deviation producing means as set forth in claim 5 wherein said augmentation means further includes electrical means responsive to movement of said control member for positioning said extensible link and thereby said deviation producing means in conformance with movement of said control member.

7. In a stabilizer system for an aerial vehicle as set forth in claim 6 said augmentation means further including pilot-operated electrical means for trimming the aircraft without repositioning the neutral no-load position of the control member.

8. In a stabilizer system for an aerial vehicle such as an aircraft equipped with movable longitudinal deviation producing means, a pilot-operated control member; a hydraulic actuator having a control valve connected to a source of pressurized hydraulic fluid, said actuator being operatively connected to said deviation producing means and adapted to move the same; mechanical means interconnecting said deviation producing means and said control member; electrical means for automatically augmenting said mechanical means including an electrically-operated hydraulically-actuated extensible link to independently position said deviation producing means, said augmentation means including means for automatically damping external pitching forces, said augmentation means also including means for controlling the actuation of said extensible link in response to the normal acceleration of the vehicle to produce a constant force on and constant displacement of the control member per unit of gravitational acceleration force applied to the vehicle, said augmentation means further including means responsive to the speed of the vehicle to produce constant positive speed stability of the vehicle.

9. In combination with an aerial vehicle equipped with deviation producing means, a basic stabilization system comprising a pilot-operated movable control member; mechanical means for actuating said deviation producing means operable by movement of said control member; means operable by movement of said control member for automatically augmenting said mechanical means including an electrically-controlled, hydraulically-motivated member to independently position said deviation producing means, said augmentation means including a first electrical means operating in parallel with said mechanical means and operable by movement of said control member for actuating said hydraulically-motivated member to independently position said deviation producing means in conformance with movement of said control member.

10. In combination with an aerial vehicle equipped with deviation producing means, a longitudinal stabilization system comprising a pilot-operated primary control member, mechanical means operatively connected to said control member and said deviation producing means to permit control of the latter by means of said control member, said stabilization system including an electrically-controlled hydraulically-actuated extensible link member for independently actuating said deviation producing means in response to an impressed electrical signal, a first electrical augmentation system for generating a signal voltage that is dependent on the aerodynamic and inertial forces acting on the aircraft for generating a signal voltage for actuating said extensible link member to move said deviation producing means, a second electrical augmentation system for generating a signal voltage that is dependent on the aerodynamic and inertial forces acting on the aircraft for generating a signal voltage for actuating said extensible link member to move said deviation producing means, said first and second electrical augmentation systems including a common command circuit operable in response to movement of the control member to generate a signal voltage for actuating said extensible link member upon movement of said control member, said hydraulically-actuated extensible link member being actuated by dual pistons with each augmentation system independently controlling one of said hydraulically-actuated pistons; a balancing means for equalizing the performance of the first and second augmentation systems, including a time delay shutoff for inactivating the augmentation systems in response to a predetermined excessive pressure differential existing across the dual pistons of the extensible link member.

11. The combination set forth in claim 10 wherein each of said augmentation systems further comprises a means responsive to pitching forces for generating and transmitting to said electrically-controlled extensible link member a signal for actuating said member to move the deviation producing surface in a manner to damp such pitching forces; a means responsive to the normal acceleration of the vehicle for generating and transmitting to said electrically-controlled extensible link member a signal for actuating said member in a manner to produce a constant force on and constant displacement of the control member per unit of gravitational acceleration applied to the vehicle; a means responsive to the speed of the vehicle for generating and transmitting to said electrically-controlled extensible link member a signal for actuating said member in a manner to produce constant positive speed stability of the vehicle, a position trim control member on said primary control member and operable thereon without displacing said primary control member; and means responsive to movement of said trim control member for generating and transmitting to said electrically controlled extensible link member a signal voltage for actuating said link member in a manner to produce the desired trim attitude and hence the desired speed of the aircraft.

References Cited in the file of this patent

UNITED STATES PATENTS

| | | |
|---|---|---|
| 2,630,284 | Feeney | Mar. 3, 1953 |
| 2,705,940 | Edwards | Apr. 12, 1955 |
| 2,819,030 | Christensen | Jan. 7, 1958 |
| 2,934,292 | Visser | Apr. 26, 1960 |
| 2,939,653 | Rasmussen et al. | June 7, 1960 |
| 2,947,285 | Baltus et al. | Aug. 2, 1960 |
| 2,950,703 | Fletcher et al. | Aug. 30, 1960 |